(12) United States Patent
Jayaratne et al.

(10) Patent No.: US 12,043,225 B1
(45) Date of Patent: Jul. 23, 2024

(54) CLEANING VEHICLE SENSORS

(71) Applicant: Zoox, Inc., Foster City, CA (US)

(72) Inventors: Rajith Jayaratne, Castro Valley, CA (US); Daniel Glenn Johnson, San Francisco, CA (US); Bingchao Han, San Ramon, CA (US); Carter William McEathron, Mountain View, CA (US); Raghuraman Surineedi, Menlo Park, CA (US); Evan David Cook, Woodside, CA (US)

(73) Assignee: Zoox, Inc., Foster City, CA (US)

( * ) Notice: Subject to any disclaimer, the term of this patent is extended or adjusted under 35 U.S.C. 154(b) by 387 days.

(21) Appl. No.: 17/540,051

(22) Filed: Dec. 1, 2021

(51) Int. Cl.
*B60S 1/62* (2006.01)
*B08B 5/02* (2006.01)

(52) U.S. Cl.
CPC .............. *B60S 1/62* (2013.01); *B08B 5/02* (2013.01); *B08B 2240/00* (2013.01)

(58) Field of Classification Search
CPC .......... B60S 1/62; B08B 5/02; B08B 2240/00
See application file for complete search history.

(56) References Cited

U.S. PATENT DOCUMENTS

| | | | | |
|---|---|---|---|---|
| 9,539,988 B2 * | 1/2017 | Hsiao | ................. | G02B 27/0006 |
| 11,364,880 B2 * | 6/2022 | Gwon | .................. | G01S 17/931 |
| 2017/0297536 A1 * | 10/2017 | Giraud | ............... | G02B 27/0006 |
| 2018/0354469 A1 * | 12/2018 | Krishnan | .............. | G01S 17/931 |
| 2018/0370496 A1 * | 12/2018 | Sykula | ....................... | B60S 1/56 |
| 2019/0009752 A1 * | 1/2019 | Rice | .......................... | B60S 1/56 |
| 2019/0077377 A1 * | 3/2019 | Schmidt | ................ | B60S 1/0848 |
| 2019/0322245 A1 * | 10/2019 | Kline | ..................... | B60S 1/0848 |
| 2020/0139940 A1 * | 5/2020 | Rice | .......................... | B60S 1/56 |
| 2021/0339711 A1 * | 11/2021 | Menicovich | ............. | B60S 1/56 |
| 2021/0402962 A1 * | 12/2021 | Li | ............................ | B60S 1/483 |
| 2022/0126791 A1 * | 4/2022 | Shimizu | .................... | B08B 3/02 |
| 2022/0402463 A1 * | 12/2022 | Fiebrandt | ................. | B60S 1/54 |
| 2023/0173555 A1 * | 6/2023 | Dingli | .................... | B08B 13/00 |
| | | | | 134/123 |

* cited by examiner

*Primary Examiner* — Michael J Zanelli
(74) *Attorney, Agent, or Firm* — EIP US LLP

(57) ABSTRACT

Techniques are described for cleaning sensors of a vehicle. An attribute of the surrounding environment (e.g., type of precipitation, intensity of precipitation, etc.) is determined along with orientations and/or attributes of the sensors (e.g. fields-of-view, focal lengths, spectral ranges, etc). Cleaning frequencies are then be determined based, at least in part, on the attribute of the environment together with the orientations and/or attributes of the sensors. Cleaning elements are then activated at the determined frequencies to clean the sensors. In some examples, the cleaning frequencies may be determined based additionally on an attribute of travel of the vehicle (e.g. direction of travel of the vehicle, speed of the vehicle, etc.).

17 Claims, 7 Drawing Sheets

| Camera | Orientation | Field-of-View | Wavelength |
|--------|-------------|---------------|------------|
| C1 | Front | Wide | Visible |
| C2 | Side | Wide | Visible |
| C3 | Rear | Wide | Visible |
| C4 | Front | Wide | Visible |
| C5 | Side | Wide | Visible |
| C6 | Rear | Wide | Visible |
| C7 | Front | Narrow | Visible |
| C8 | Front | Ultra-Wide | Long Infrared |
| C9 | Side | Ultra-Wide | Long Infrared |
| C10 | Rear | Wide | Visible |
| C11 | Side | Wide | Visible |
| C12 | Front | Wide | Visible |
| C13 | Rear | Wide | Visible |
| C14 | Side | Wide | Visible |
| C15 | Front | Wide | Visible |
| C16 | Rear | Narrow | Visible |
| C17 | Rear | Ultra-Wide | Long Infrared |
| C18 | Side | Ultra-Wide | Long Infrared |

FIG. 2

| Sequence #1 | | |
|---|---|---|
| Precip. | Low | |
| Speed | N/A | |
| Direction | N/A | Freq. (Hz) |
| 1 | C1 (front/rear) | 0.93 |
| 2 | C4 (front/rear) | 0.93 |
| 3 | C2 (side) | 0.93 |
| 4 | C5 (side) | 0.93 |
| 5 | C7 (narrow) | 0.93 |
| 6 | C8 (IR) | 0.93 |
| 7 | C9 (IR) | 0.93 |
| 8 | C3 (rear/front) | 0.93 |
| 9 | C6 (rear/front) | 0.93 |

| Sequence #2 | | |
|---|---|---|
| Precip. | Medium | |
| Speed | ≤ THLD | |
| Direction | N/A | Freq. (Hz) |
| 1 | C1 (front/rear) | 1.19 |
| 2 | C4 (front/rear) | 1.19 |
| 3 | C2 (side) | 1.19 |
| 4 | C5 (side) | 1.19 |
| 5 | C3 (rear/front) | 1.19 |
| 6 | C6 (rear/front) | 1.19 |
| 8 | C8 (IR) | 0.40 |
| 9 | C1 (front/rear) | 1.19 |
| 10 | C4 (front/rear) | 1.19 |
| 11 | C2 (side) | 1.19 |
| 12 | C5 (side) | 1.19 |
| 13 | C3 (rear/front) | 1.19 |
| 14 | C6 (rear/front) | 1.19 |
| 15 | C9 (IR) | 0.40 |
| 16 | C1 (front/rear) | 1.19 |
| 17 | C4 (front/rear) | 1.19 |
| 18 | C2 (side) | 1.19 |
| 19 | C5 (side) | 1.19 |
| 20 | C3 (rear/front) | 1.19 |
| 21 | C6 (rear/front) | 1.19 |
| 22 | C7 (narrow) | 0.40 |

| Sequence #3 | | |
|---|---|---|
| Precip. | Medium | |
| Speed | > THLD | |
| Direction | First | Freq. (Hz) |
| 1 | C1 (front) | 1.47 |
| 2 | C4 (front) | 1.47 |
| 3 | C2 (side) | 1.47 |
| 4 | C5 (side) | 1.47 |
| 5 | C8 (IR) | 0.49 |
| 6 | C9 (IR) | 0.49 |
| 7 | C1 (front) | 1.47 |
| 8 | C4 (front) | 1.47 |
| 9 | C2 (side) | 1.47 |
| 10 | C5 (side) | 1.47 |
| 11 | C3 (rear) | 0.49 |
| 12 | C6 (rear) | 0.49 |
| 13 | C1 (front) | 1.47 |
| 14 | C4 (front) | 1.47 |
| 15 | C2 (side) | 1.47 |
| 16 | C5 (side) | 1.47 |
| 17 | C7 (narrow) | 0.49 |

| Sequence #4 | | |
|---|---|---|
| Precip. | Medium | |
| Speed | > THLD | |
| Direction | Second | Freq. (Hz) |
| 1 | C3 (front) | 1.47 |
| 2 | C6 (front) | 1.47 |
| 3 | C2 (side) | 1.47 |
| 4 | C5 (side) | 1.47 |
| 5 | C8 (IR) | 0.49 |
| 6 | C9 (IR) | 0.49 |
| 7 | C3 (front) | 1.47 |
| 8 | C6 (front) | 1.47 |
| 9 | C2 (side) | 1.47 |
| 10 | C5 (side) | 1.47 |
| 11 | C1 (rear) | 0.49 |
| 12 | C4 (rear) | 0.49 |
| 13 | C3 (front) | 1.47 |
| 14 | C6 (front) | 1.47 |
| 15 | C2 (side) | 1.47 |
| 16 | C5 (side) | 1.47 |
| 17 | C7 (narrow) | 0.49 |

FIG. 5

| Sequence #5 | | |
|---|---|---|
| Precip. | Heavy | |
| Speed | ≤ THLD | |
| Direction | First | Freq. (Hz) |
| 1 | C1 (front) | 2.22 |
| 2 | C4 (front) | 2.22 |
| 3 | C2 (side) | 0.56 |
| 4 | C5 (side) | 0.56 |
| 5 | C1 (front) | 2.22 |
| 6 | C4 (front) | 2.22 |
| 7 | C8 (IR) | 0.56 |
| 8 | C9 (IR) | 0.56 |
| 9 | C1 (front) | 2.22 |
| 10 | C4 (front) | 2.22 |
| 11 | C3 (rear) | 0.56 |
| 12 | C6 (rear) | 0.56 |
| 13 | C1 (front) | 2.22 |
| 14 | C4 (front) | 2.22 |
| 15 | C7 (narrow) | 0.56 |

| Sequence #6 | | |
|---|---|---|
| Precip. | Heavy | |
| Speed | ≤ THLD | |
| Direction | Second | Freq. (Hz) |
| 1 | C3 (front) | 2.22 |
| 2 | C6 (front) | 2.22 |
| 3 | C2 (side) | 0.56 |
| 4 | C5 (side) | 0.56 |
| 5 | C3 (front) | 2.22 |
| 6 | C6 (front) | 2.22 |
| 7 | C8 (IR) | 0.56 |
| 8 | C9 (IR) | 0.56 |
| 9 | C3 (front) | 2.22 |
| 10 | C6 (front) | 2.22 |
| 11 | C1 (rear) | 0.56 |
| 12 | C4 (rear) | 0.56 |
| 13 | C3 (front) | 2.22 |
| 14 | C6 (front) | 2.22 |
| 15 | C7 (narrow) | 0.56 |

| Sequence #7 | | |
|---|---|---|
| Precip. | Heavy | |
| Speed | > THLD | |
| Direction | First | Freq. (Hz) |
| 1 | C1 (front) | 2.78 |
| 2 | C4 (front) | 2.78 |
| 3 | C2 (side) | 0.46 |
| 4 | C1 (front) | 2.78 |
| 5 | C4 (front) | 2.78 |
| 6 | C5 (side) | 0.46 |
| 7 | C1 (front) | 2.78 |
| 8 | C4 (front) | 2.78 |
| 9 | C3 (rear) | 0.46 |
| 10 | C1 (front) | 2.78 |
| 11 | C4 (front) | 2.78 |
| 12 | C6 (rear) | 0.46 |
| 13 | C1 (front) | 2.78 |
| 14 | C4 (front) | 2.78 |
| 15 | C8 (IR) | 0.46 |
| 16 | C1 (front) | 2.78 |
| 17 | C4 (front) | 2.78 |
| 18 | C9 (IR) | 0.46 |
| 19 | C1 (front) | 2.78 |
| 20 | C4 (front) | 2.78 |
| 21 | C7 (narrow) | 0.46 |

| Sequence #8 | | |
|---|---|---|
| Precip. | Heavy | |
| Speed | > THLD | |
| Direction | Second | Freq. (Hz) |
| 1 | C3 (front) | 2.78 |
| 2 | C6 (front) | 2.78 |
| 3 | C2 (side) | 0.46 |
| 4 | C3 (front) | 2.78 |
| 5 | C6 (front) | 2.78 |
| 6 | C5 (side) | 0.46 |
| 7 | C3 (front) | 2.78 |
| 8 | C6 (front) | 2.78 |
| 9 | C1 (rear) | 0.46 |
| 10 | C3 (front) | 2.78 |
| 11 | C6 (front) | 2.78 |
| 12 | C4 (rear) | 0.46 |
| 13 | C3 (front) | 2.78 |
| 14 | C6 (front) | 2.78 |
| 15 | C8 (IR) | 0.46 |
| 16 | C3 (front) | 2.78 |
| 17 | C6 (front) | 2.78 |
| 18 | C9 (IR) | 0.46 |
| 19 | C3 (front) | 2.78 |
| 20 | C6 (front) | 2.78 |
| 21 | C7 (narrow) | 0.46 |

FIG. 5 (CONT.)

CLEANING VEHICLE SENSORS

BACKGROUND

A vehicle may comprise sensors for use in perceiving the surrounding environment. The vision of the sensors may be compromised by precipitation that accumulates on the sensors, e.g., due to snow, rain, fog, mist or the like. The vehicle may therefore comprise a cleaning system to clean the sensors.

BRIEF DESCRIPTION OF THE DRAWINGS

The detailed description is described with reference to the accompanying figures. The use of the same reference numbers in different figures indicates similar or identical components or features.

FIG. 2 details example sensors of the example vehicle.

FIG. 5 details an example set of cleaning sequences.

DETAILED DESCRIPTION

Figure 1:
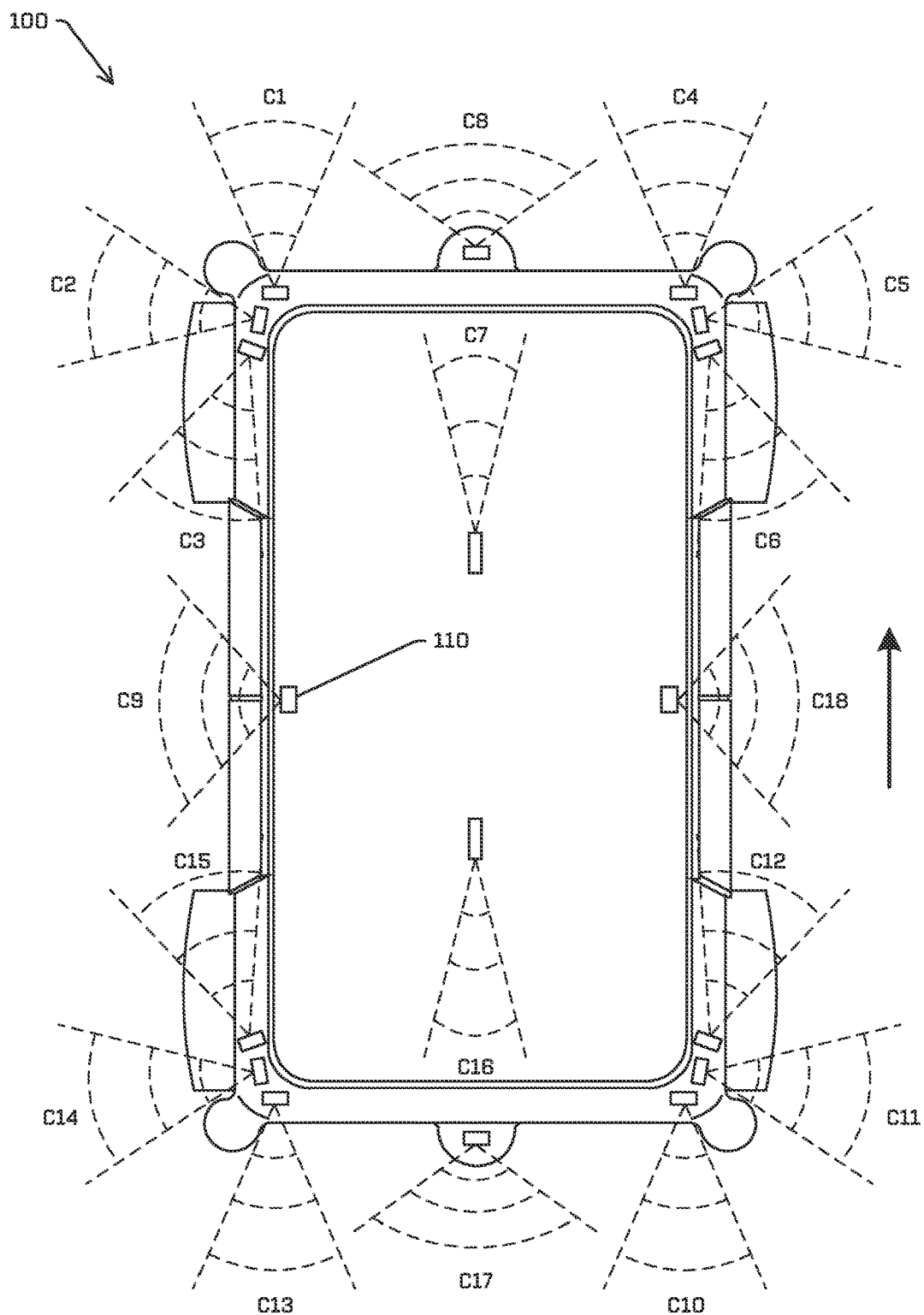
FIG. 1 is a schematic top view of an example vehicle.

This disclosure is directed to the cleaning of sensors of a vehicle. The sensors may include lidar, sonar, radar, cameras, and other sensors that provide information regarding the surrounding environment of the vehicle. During use of the vehicle, the vision of one or more of the sensors may be compromised by precipitation that accumulates on the sensors, e.g. due to snow, rain, fog, mist or the like. For an autonomous vehicle, any compromise in the vision of the sensors may degrade the vehicle's ability to navigate accurately and with confidence.

The vehicle may comprise a cleaning system to clean the sensors. The cleaning system may comprise one or more cleaning elements, each of which is associated with a respective sensor and may be activated to clean the respective sensor. In examples, the cleaning elements may comprise nozzles that are directed at the sensors. Activating the cleaning elements may then cause compressed gas, such as air, to be emitted from the nozzles to clean the sensors. In other examples, the cleaning elements may comprise wipers that are in contact with the sensors. Activating the cleaning elements may then cause the wipers to move across the surfaces of the sensors to clean the sensors.

In examples, the cleaning elements may be activated independently, which is to say that each of the cleaning elements may be activated independently of the other cleaning elements. In other examples, groups of cleaning elements may be activated, with the cleaning elements within each group activated jointly. Each of the cleaning elements, whether activated in isolation or as part of group, may be activated at the same cleaning frequency. The applicant has observed, however, that different sensors may be compromised to different degrees by the accumulation of precipitation. In examples, precipitation may accumulate at different rates on sensors having different orientations. For example, during forward travel of the vehicle, precipitation may accumulate on forward-facing sensors at a faster rate than rearward-facing sensors or sideward-facing sensors. In other examples, sensors having different attributes, such as field-of-view, focal length or spectral range, may be compromised differently by the accumulation of precipitation. For example, the vision of sensors having a wider field-of-view or a longer focal length may be compromised more severely than sensors having a narrower field-of-view or shorter focal length. In further examples, sensors having a higher spectral range (e.g., visible wavelengths) may be compromised more severely than sensors having a lower spectral range (e.g., infrared wavelengths).

The cleaning elements may therefore be activated at cleaning frequencies that are based, at least in part, on one or more of orientations of the sensors or attribute of the sensors. As a result, sensors whose vision is more likely to be compromised by the prevailing precipitation may be cleaned at higher frequencies.

In examples, it may be desirable to clean the sensors at frequencies that are additionally based on an attribute of the environment, such as the type of precipitation or the intensity of the precipitation. For example, the vision of one or more of the sensors may be compromised more severely by snow than, say, by rain. In other examples, as the intensity of the precipitation increases, precipitation may accumulate on the sensors at a faster rate. It may therefore be desirable to clean the sensors at a higher frequency in order to maintain good vision. However, where the sensors at cleaned at the same frequency, activating the cleaning elements at a higher frequency may present challenges. In examples where the cleaning elements comprise nozzles that emit compressed gas, the cleaning system may comprise a tank that stores compressed gas, and a compressor to charge the tank. The frequency at which the cleaning elements can be activated may therefore be limited by size of the tank or the flow rate of the compressor. As a result, a higher cleaning frequency may require a larger tank or a compressor having a higher flow rate. However, both options are likely to increase the cost and space requirements of the cleaning system. Additionally, a compressor having a higher flow rate is likely to draw a higher power, which then adversely impacts the efficiency of the vehicle, especially if the vehicle is an electric vehicle. In other examples where the cleaning elements comprise wipers, the cleaning system may comprise one or more electric motors for driving the wipers. The cleaning frequency of the wipers may then be limited by the speed of the electric motors. Accordingly, a higher cleaning frequency may require electric motors of higher output power in order deliver higher speeds for the same output torque. However, this is then likely to increase the cost and potentially the size of the electric motors. Additionally, employing electric motors of higher output power may adversely impact the efficiency of the vehicle.

As noted, different sensors may be compromised to different degrees by the prevailing precipitation. Accordingly, rather than employing the same cleaning frequency for all sensors, different cleaning frequencies may be employed for different sensors without adversely affecting the overall vision. Higher cleaning frequencies may then be employed for those sensors whose vision is more likely to be compromised. Moreover, the higher cleaning frequencies may be achieved at the expense of lower cleaning frequencies for those sensors whose vision is less likely to be compromised by the prevailing precipitation. As a result, improved vision may be achieved without the need for hardware changes or an increase in power consumption.

The sensors of the vehicle may comprise a first sensor and a second sensor. The first sensor may comprise one or more of: an orientation that is predominantly forward-facing relative to a direction of travel of the vehicle, a first field-of-view, a first focal length, or a first spectral range. The second sensor may comprise one or more of: an orientation that is predominantly rearward-facing or sideward-facing relative to the direction of travel of the vehicle, a second field-of-view narrower than the first field-of-view, a second focal length longer than the first focal length, or a second spectral range lower than the first spectral range. The cleaning element associated with the first sensor may be activated at a first cleaning frequency and the cleaning element associated with the second sensor may be activated at a second cleaning frequency. For reasons noted above, the vision of the first sensor may be compromised more severely than that of the second sensor by the accumulation of precipitation. Accordingly, the first cleaning frequency may be higher than the second cleaning frequency.

In examples, the cleaning elements may be activated at cleaning frequencies that are based, at least in part, on an attribute of travel of the vehicle. As noted above, precipitation may accumulate at different rates on sensors having different orientations. For example, precipitation may accumulate on forward-facing sensors at a faster rate than, say, rearward-facing or sideward-facing sensors. The vehicle may be bidirectional and the cleaning frequencies may be based, at least in part, on the direction of travel of the vehicle. As a result, forward-facing sensors may be prioritized (i.e., cleaned at a higher frequencies) irrespective of the direction of travel of the vehicle. The rate at which precipitation accumulates on the sensors may depend on the speed of the vehicle. For example, as the speed of the vehicle increases, precipitation may accumulate at a faster rate on, say, forward-facing sensors and may accumulate at a slower rate on, say, rearward-facing sensors. The cleaning frequencies may therefore be additionally based on, at least in part, the speed of the vehicle. As a result, forward-facing sensors may be prioritized in response to an increase in the speed of the vehicle.

In examples, the cleaning elements may be activated in accordance with a sequence, which specifies an order in which the sensors are to be cleaned. Activating the cleaning elements in accordance with a sequence provides a convenient mechanism for achieving different cleaning frequencies for different sensors. In examples, the cleaning sequence may be based, at least in part, on an attribute of the environment (e.g., type or intensity of precipitation) and/or an attribute of travel (e.g., direction of travel or a speed of the vehicle). In examples, the cleaning sequence may be selected from a plurality of predefined cleaning sequences based on, at least in part, the attribute of the environment and/or the attribute of travel.

This disclosure is also generally directed to a method for cleaning a sensor of a vehicle. The method may comprise determining an attribute of an environment of a vehicle, such as the type of precipitation or the intensity of precipitation. The method may further comprise determining one or more of an orientation of a sensor of the vehicle or an attribute of the sensor, such as the field-of-view, the focal length or the spectral range of the sensor. The method may then determine, based at least in part on the attribute of the environment and one or more of the orientation of the sensor or the attribute of the sensor, a frequency to activate a cleaning element which is configured to clean the sensor, and to activate the cleaning element at the determined frequency to clean the sensor.

Example systems and methods are described below in the context of passenger vehicles (e.g., personal vehicles such as cars and trucks, and for-hire vehicles such as taxicabs and shuttles). However, the techniques of the present disclosure are not so limited and may equally be used in the cleaning of sensors of other vehicles, such as buses, trains, boats and planes.

FIG. 1 is a plan view of an example vehicle 100. The vehicle 100 comprises one or more sensors 110 that capture data of the surrounding environment. The sensors 110 may comprise one or more of lidar, sonar, radar, cameras, or other sensors capable of capturing data of the surrounding environment.

In examples, the vehicle 100 may be a fully autonomous vehicle and the captured data may be used to autonomously control the vehicle 100. The vehicle 100 may be an autonomous vehicle configured to operate according to a Level 5 classification defined by the U.S. National Highway Traffic Safety Administration. This classification describes a vehicle capable of performing all safety-critical functions for an entire trip, without occupants of the vehicle being required to control the vehicle at any time. In other examples, the vehicle 100 may a non-autonomous vehicle or a partially autonomous vehicle having a different level of classification, and the data captured by the sensors 110 may be used to assist, either passively or actively, the driver of the vehicle 100.

In the illustrated example, the vehicle 100 comprises eighteen sensors 110 located at various positions around the vehicle 100. In other examples, the vehicle 100 may comprise an alternative number of sensors. In the illustrated example, the sensors 110 are arranged symmetrically about the vehicle. Moreover, the sensors 110 are arranged as two identical arrays. The sensors of the first array, labelled C1-C9 in FIG. 1, are located on one half of the vehicle 100, and the sensors of the second array, labelled C10-C18 in FIG. 1, are located on the other half of the vehicle. The two arrays then have a two-fold rotational symmetry. The vehicle 100 of the illustrated example may be a bidirectional vehicle. By having a symmetrical sensor arrangement, the same vision may be provided by the sensors 110 irrespective of the direction of travel of the vehicle 100. In other examples, the arrangement of the sensors 110 may be asymmetric, particularly but not exclusively if the vehicle 100 is unidirectional.

The sensors 110 may comprise one or more sensors have different orientations. In some examples, the sensors 110 may comprise one or more of a forward-facing sensor, a sideward-facing sensor or a rearward-facing sensor. The term 'forward-facing' should be understood to mean that the orientation of the sensor is predominantly forward-facing relative to a direction of travel of the vehicle. Likewise, the terms 'sideward-facing' and 'rearward-facing' should be understood to mean that the orientation of the sensor, relative to the direction of travel, is predominantly sideward-facing or rearward-facing.

The sensors 110 may comprise one or more sensors having different attributes, such as fields-of-view, focal lengths or spectral ranges. In examples, the sensors 110 may comprise one or more sensors having a narrow field-of-view, a wide field-of-view or an ultra-wide field-of-view. The terms 'narrow', 'wide' and 'ultra-wide' are used here in the relative sense and should not be understood as implying a particular angle for the field-of-view. In some examples, the sensors 110 may comprise one or more sensors having different horizontal fields-of-view. In other examples, the sensors 110 may comprise one or more sensors having different vertical fields-of-view.

In examples, the sensors 110 may comprise one or more sensors having a visible spectral range (i.e., sensitive to visible wavelengths), an IR spectral range (i.e., sensitive to infrared wavelengths), or a UV spectral range (i.e., sensitive to ultraviolet wavelengths).

FIG. 2 details a possible arrangement of sensors 110 for the example vehicle 100. As noted, the example vehicle 100 comprises eighteen sensors, C1-C18, which are arranged as two identical arrays, C1-C9 and C10-C18. In the example of FIG. 2, each of the arrays comprises seven visible-light cameras, and two infrared cameras. Of the visible-light cameras, six have a wide field-of-view and one has a narrow field-of-view. Of the visible-light cameras having a wide field-of-view, two are forward-facing, two are sideward-facing, and two are rearward-facing. The visible-light camera having a narrow field-of-view is either forward-facing or rearward-facing depending on the direction of travel of the vehicle. The two infrared cameras are long-wavelength infrared cameras having an ultra-wide field-of-view. One of the infrared cameras is sideward-facing and the other is either forward-facing or rearward-facing depending on the direction of travel. Collectively, irrespective of the direction of travel, the sensors 110 of this particular example comprise six forward-facing cameras, six rearward-facing cameras, and six sideward-facing cameras. In other examples, the vehicle 100 may comprise an alternative arrangement (e.g., number, types, or locations) of sensors. The orientations of the sensors 110 in FIG. 2 are relative to the direction of travel indicated by the arrow in FIG. 1. If the vehicle 100 were to travel in the opposite direction then, of course, those sensors indicated in FIG. 2 as forward-facing will instead be rearward-facing, and those sensors indicated as rearward-facing will instead be forward-facing.

During use of the example vehicle 100, the vision of one or more of the sensors 110 may be compromised by precipitation that accumulates on the sensors 110, e.g. due to snow, rain, fog, mist or the like. The example vehicle 100 may therefore comprise one or more cleaning systems to clean the sensors 110.

Figure 3:
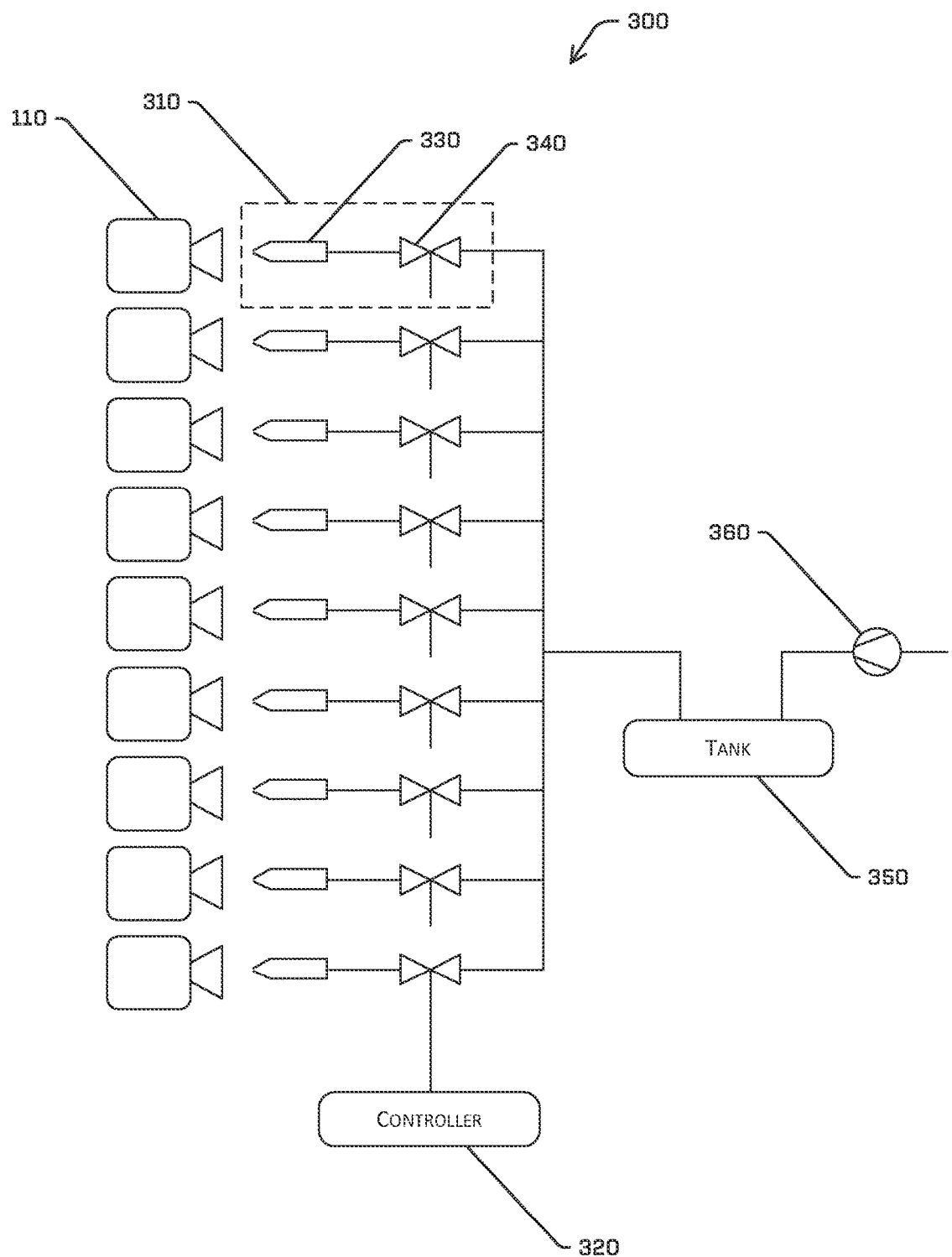
FIG. 3 is a schematic of an example cleaning system.

FIG. 3 is a schematic diagram of an example cleaning system 300. The cleaning system 300 comprises a plurality of cleaning elements 310, and a controller 320 to activate the cleaning elements 310.

Each of the cleaning elements 310 is associated with a respective sensor 110 of the vehicle 100, and cleans the respective sensor 110 when activated. In examples, the cleaning elements 310 may comprise nozzles that are directed at the sensors 110. Activating the cleaning elements 310 may then cause a gas or liquid to be emitted from the nozzles to clean the sensors. In other examples, the cleaning elements 310 may comprise wipers that are in contact with the sensors. Activating the cleaning elements 310 may then cause the wipers to move across the surfaces of the sensors 110 to clean the sensors. Nozzles may clean the sensors without obscuring the vision of the sensors. Additionally, nozzles may be capable of higher cleaning frequencies than that of wipers. Furthermore, the period over which a nozzle is activated (and thus the amount of gas or liquid emitted from the nozzle) may be controlled to provide greater cleaning control. For example, different activation periods may be used to clean different sensors, and/or different activation periods may be used based on the type and/or the intensity of the precipitation that accumulates on the sensors. Wipers, on the other hand, may provide more effective cleaning of the sensors. In some examples, the cleaning elements 310 may comprise both nozzles and wipers. For example, multiple cleaning elements (e.g., a nozzle and a wiper) may be associated with the same sensor. In other examples, different cleaning elements may be associated with different sensors. For example, the cleaning element associated with a visible-light camera may comprise a nozzle, whilst the cleaning element associated with an infrared camera may comprise a wiper.

In the illustrated example of FIG. 3, the cleaning elements 310 comprise nozzles 330 that are directed at the sensors 110. The cleaning system 300 further comprises one or more tanks 350 to store compressed gas, and one or more compressors 360 to charge the tanks 340. The cleaning elements 310 are then coupled to the tanks 350 and comprise one or more valves 340, such as solenoids, for controlling the supply of compressed gas from the tanks 340 to the nozzles 330. Activation of the cleaning elements 310 may comprise activating the valves 340 momentarily, which in turn causes the valves 340 to open momentarily such that jets of compressed gas are emitted from the nozzles 330. In other examples, the compressors 360 may be omitted and the cleaning system 300 may comprise one or more larger tanks that are pre-charged with gas (e.g., via an external source). In further examples, the tanks 350 and the compressors 360 may be omitted and each of the cleaning elements 310 may comprise a compressor or pump which, when activated, generates a jet of fluid (e.g., gas or liquid) that is emitted from the nozzles 330.

The example cleaning system 300 illustrated in FIG. 3 comprises nine cleaning elements 310. Accordingly, when employed with the example vehicle 100 of FIG. 1, the cleaning system 300 may be used to clean the sensors 110 of one of the two sensor arrays. The example vehicle 100 may therefore comprise a first cleaning system for cleaning the first array of sensors, C1-C9, and a second cleaning system for cleaning the second array of sensors, C10-C18. By providing two cleaning systems, packaging the cleaning systems within the example vehicle 100 may be made easier. For example, it may be easier to package two smaller tanks and two smaller compressors within the vehicle in comparison to, say, a single larger tank and a single larger compressor. Additionally, having two cleaning systems provides a degree of redundancy. Accordingly, should a fault arise with one of the cleaning systems, the other cleaning system may continue to function and thus one of the sensor arrays may continue to provide good vision. Nevertheless, in other examples, the vehicle 100 may comprise a single cleaning system for cleaning the sensors 110. In further examples, the vehicle 100 may comprise more than two cleaning systems for cleaning the sensors. By way of example, the vehicle 100 may comprise four cleaning systems, each of which is responsible for cleaning the sensors within one quadrant of the vehicle.

In examples, the cleaning elements 310 of the cleaning system 300 may be activated independently; that is to say that each of the cleaning elements 310 may be activated independently of the other cleaning elements. In other examples, groups of cleaning elements 310 may be activated independently, and the cleaning elements 310 within each group may be activated jointly. In the example illustrated in FIG. 3, each of the cleaning elements 310 may be activated independently. Each of the cleaning elements 310 in the illustrated example comprises a valve 340, such as a solenoid, that may be activated by the controller 320. In other examples, however, a group of cleaning elements may comprise by a single valve which, when activated, causes multiple sensors to be cleaned concurrently.

The controller 320 is responsible for activating the cleaning elements 310. The controller 320 may activate sequentially the cleaning elements 310 or the groups of cleaning elements 310, if so grouped. Where the cleaning elements 310 comprise nozzles that emit compressed gas when activated, activating the cleaning elements, or groups of cleaning elements, sequentially may enable a smaller source of compressed gas to be used. For example, the cleaning system 300 of FIG. 3 may comprise smaller tanks 350 or smaller compressors 360. Where the cleaning elements 310 comprise wipers, the movement of the wipers across the sensors 110 may obscure and therefore compromise the vision of the sensors 110. By activating sequentially the cleaning elements or groups of cleaning elements, only some of the sensors 110 may be obscured at any one time.

In activating the cleaning elements 310 sequentially, each of the cleaning elements 310, whether activated in isolation or as part of group, is activated at a particular cleaning frequency. The controller 320 may activate the cleaning elements 310 at the same cleaning frequency. So, for example, the controller 320 may activate the cleaning element for sensor C1, followed by the cleaning element for sensor C2, and so on through to the cleaning element for sensor C9. The controller 320 may then repeat this sequence. As a result, each of the sensors C1-C9 is cleaned at the same cleaning frequency.

The applicant has observed, however, that different sensors 110 of the vehicle 100 may be compromised differently by the accumulation of precipitation. In examples, precipitation may accumulate at different rates on sensors having different orientations. For example, during forward travel of the vehicle 100, precipitation may accumulate on forward-facing sensors at a faster rate than rearward-facing sensors or sideward-facing sensors. In other examples, sensors having different attributes, such as fields-of-view, focal lengths or spectral ranges, may be compromised differently by the accumulation of precipitation. For example, the vision of sensors having a wider field-of-view or a shorter focal length may be compromised more severely than sensors having a narrower field-of-view or a longer focal length. In further examples, sensors having a spectral range at visible wavelengths may be compromised more severely than sensors having a spectral range at ultraviolet or infrared wavelengths. Moreover, sensors having a spectral range at near UV, visible or near IR wavelengths may be compromised more severely than sensors having a spectral range at mid-wavelength IR or long-wavelength IR.

The controller 320 may therefore activate each of the cleaning elements 310 at a cleaning frequency that is based, at least in part, on an orientation of the respective sensor and/or an attribute of the respective sensor. As a result, sensors whose vision is more likely to be compromised by the prevailing precipitation may be cleaned at a higher frequency. The higher cleaning frequency may be achieved at the expense of a lower cleaning frequency for those sensors whose vision is less likely to be compromised by the prevailing precipitation. As a result, improved vision may be achieved without the need for hardware changes or an increase in power consumption.

In examples, the sensors 110 of the vehicle 100 may comprise one or more first sensors and one or more second sensors. The first sensors may comprise one or more of: an orientation that is predominantly forward-facing relative to a direction of travel of the vehicle, a first field-of-view, a first focal length, or a first spectral range. The second sensors may comprise one or more of: an orientation that is predominantly rearward-facing or sideward-facing relative to the direction of travel of the vehicle, a second field-of-view narrower than the first field-of-view, a second focal length longer than the first focal length, or a second spectral range lower than the first spectral range. The controller 320 may then activate the cleaning elements 310 associated with the first sensors at a first cleaning frequency and activate the cleaning elements 310 associated with the second sensors at a second cleaning frequency. For reasons noted above, the vision of the first sensors may be compromised more severely than that of the second sensors by the prevailing precipitation. Accordingly, the first cleaning frequency may be higher than the second cleaning frequency.

The controller 320 may activate the cleaning elements 310 in accordance with a sequence, which is then be repeated. The cleaning frequency of each of the cleaning elements 310 may then be based, at least in part, on the number of occurrences of an identifier for that cleaning element within the sequence. In examples, the identifier may identify a particular cleaning element or group of cleaning elements. In other examples, the identifier may identify a particular sensor or group of sensors.

The rate at which precipitation accumulates on the sensors 110 may depend additionally on an attribute of travel of the vehicle and/or an attribute of the environment. Accordingly, in examples, the controller 320 may determine cleaning frequencies for the sensors 110 based, at least in part, on an attribute of travel of the vehicle and/or an attribute of the environment.

The attribute of travel may comprise, for example, a direction of travel of the vehicle and/or a speed of the vehicle. As noted above, precipitation may accumulate at different rates on sensors having different orientations. For example, precipitation may accumulate on forward-facing sensors at a faster rate than, say, rearward-facing or sideward-facing sensors. Accordingly, the controller 320 may determine the direction of travel of the vehicle 100, and determine cleaning frequencies for the sensors 110 based, at least in part, on the direction of travel. As a result, forward-facing sensors may be prioritized (i.e., cleaned at a higher cleaning frequency) irrespective of the direction of travel of the vehicle 100.

The rate at which precipitation accumulates on the sensors 110 may also depend on the speed of the vehicle 100. For example, as the speed of the vehicle 100 increases, precipitation may accumulate at a faster rate on, say, forward-facing sensors and/or may accumulate at a slower rate on, say, rearward-facing sensors. The controller 320 may therefore determine a speed of the vehicle 100, and determine cleaning frequencies for the sensors 110 based, at least in part, on the speed of the vehicle. As a result, forward-facing sensors, for example, may be prioritized in response to an increase in the speed of the vehicle 100. As noted, sensors having different fields-of-view, different focal lengths or different spectral ranges may be compromised to different degrees by the accumulation of precipitation. Accordingly, whilst the controller 320 may prioritize, for example, forward-facing sensors in response to an increase in the speed of the vehicle 100, the controller 320 need not necessarily prioritize all forward-facing sensors. Indeed, it is quite possible that, in response to an increase in the speed of the vehicle 100, the controller 320 may increase the cleaning frequency of one or more of the forward-facing sensors (e.g., visible-light cameras) but decrease the cleaning frequency of one or more of the other forward-facing sensors (e.g., infrared cameras).

The attribute of the environment may comprise, for example, one or more of a type of precipitation (e.g., snow, rain, fog), an intensity of precipitation (e.g., light, medium, heavy), a wind speed, a wind direction, an ambient temperature, or an ambient humidity.

The vision of the sensors 110 may be compromised differently by different types of precipitation. For example, the vision of one or more of the sensors may be compromised more severely by snow than, say, by rain. In some examples, sensors having different attributes may be compromised differently by the same type of precipitation. In other examples, different types of precipitation may accumulate at different rates on the sensors 110. The intensity of precipitation may likewise influence the way in which the vision of the sensors is compromised. For example, as the intensity of precipitation increases, precipitation is likely to accumulate at a faster rate on the sensors 110. As already noted, different sensors may be compromised to different degrees by the accumulation of precipitation. Accordingly, whilst each of the sensors 110 may experience increased precipitation, some of the sensors may be affected more than others by the increase in intensity. The controller 320 may therefore determine the type and/or the intensity of precipitation, and determine cleaning frequencies for the sensors 110 based, at least in part, on the type and/or intensity of precipitation. As a result, sensors whose vision is more likely to be compromised by the type of precipitation and/or the intensity of the precipitation may be prioritized.

In examples, the attribute of travel of the vehicle and/or the attribute of the environment may be determined from data received by the controller 320. The data may be received from one or more sources and may include sources internal or external to the vehicle 100. The data received by the controller 320 may originate from multiple sources. As a result, a more robust determination may be made of the attribute of travel and/or the attribute of the environment.

In examples, the vehicle 100 may comprise one or more of a vehicle speed sensor, wheel speed sensor or other sensor (e.g., GPS device) from which one or more attributes of travel (e.g. direction of travel and/or the speed of the vehicle) may be determined. In other examples, the vision provided by the sensors 110 may be used to determine a geolocation of the vehicle 100, from which one or more attributes of travel may be determined.

In examples, the vision provided by the sensors 110 may be used to determine one or more attributes of the environment. For example, the vision provided by the sensors 110 may be used to determine the type and/or the intensity of the precipitation. In other examples, the vehicle 100 may comprise one or more additional sensors for determining attributes of the environment. For example, the vehicle may comprise additional sensors for determining the ambient temperature and/or the ambient humidity. In further examples, the vehicle 100 may receive real-time weather information from an external source, such as a weather service or other vehicle, from which one or more attributes of the environment may be determined.

As noted above, the controller 320 may activate the cleaning elements 310 in accordance with a sequence, which may then be repeated. In examples, the controller 320 may store a plurality of predefined sequences. Each of the predefined sequences may then define an order in which the sensors 110 are to be cleaned. The controller 320 may then select one of the predefined sequences based, at least in part, on the attribute(s) of travel and/or the attribute(s) of the environment. For example, the controller 320 may select one of the predefined sequences based, at least in part, on the direction of travel of the vehicle, the speed of the vehicle, the type of precipitation and/or the intensity of precipitation.

In examples, the controller 320 may determine that one or more of the sensors 110 has compromised vision. For example, in spite of the sensors 110 being cleaned sequentially, one or more of the sensors 110 may experience a sudden increase in precipitation (e.g., from a splash) or the accumulation of solid matter (e.g., dirt or debris) that compromises the vision of the sensors. In this instance, the controller 320 may interrupt or suspend the cleaning sequence, activate those cleaning elements 310 associated with the sensors having the compromised vision to clean the sensors, and then resume the cleaning sequence. In this way, the cleaning system 330 is able to react more quickly to sensors whose vision is suddenly compromised.

In examples, the controller 320 may comprise one or more processors and one or more non-transitory storage media. The storage media may store instructions which, when executed by the one or more processors, perform one or more of the operations, techniques, features and/or functionality described above in relation to the controller 320.

The operations, techniques, features and/or functionality of the controller 320 may be implemented more generally as a method for cleaning the sensors of a vehicle. In examples, the method may comprise determining one or more of an orientation of a sensor of the vehicle or an attribute of the sensor. The method may further comprise determining, based at least in part on the orientation or the attribute of the sensor, a frequency to activate a cleaning element of the vehicle to clean the sensor. The method may then comprise activating the cleaning element at the determined frequency to clean the sensor. The method may comprise additional features in order to implement one or more of the operations, techniques, features and/or functionality described above in relation to the controller 320.

Figure 4:
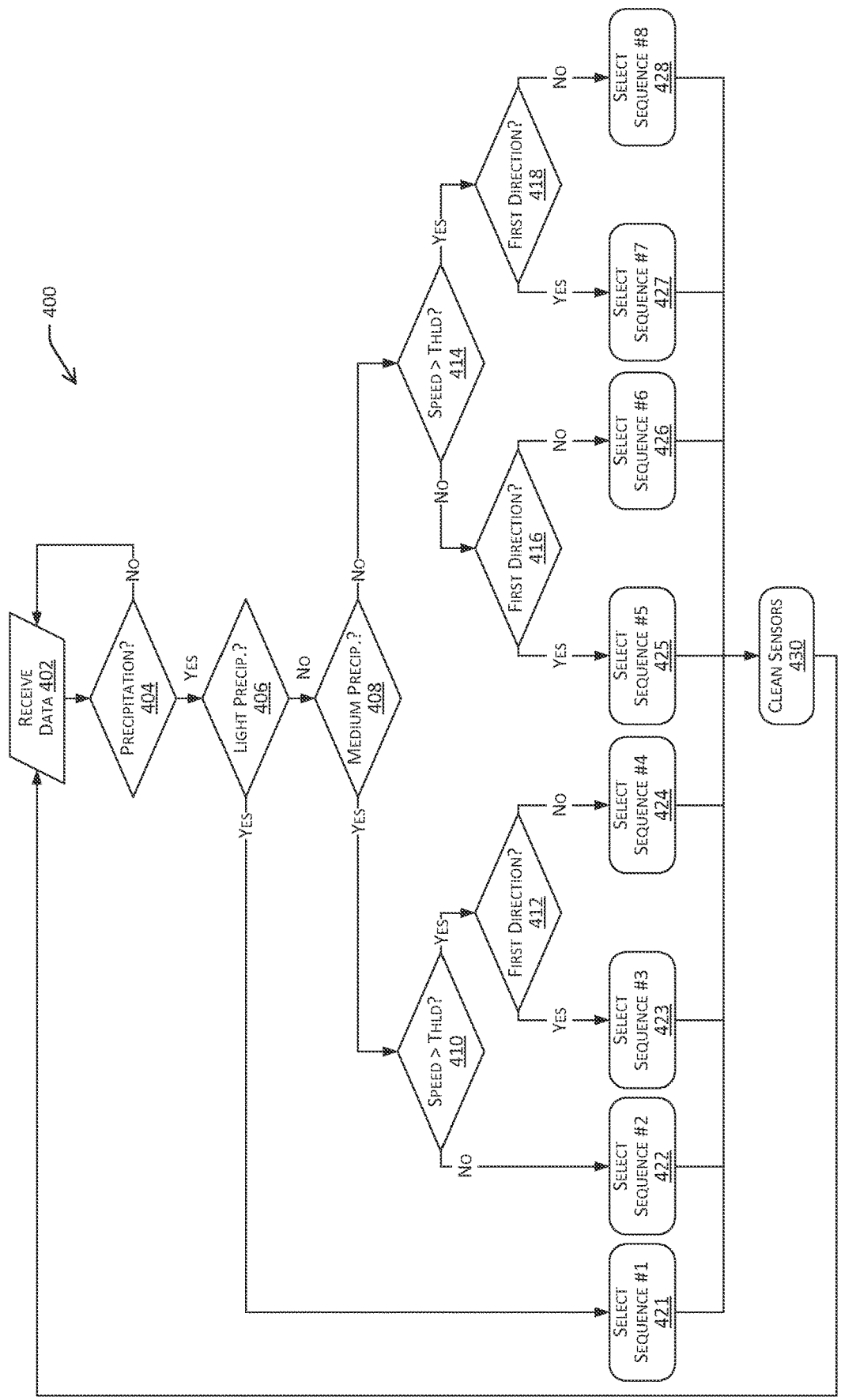
FIG. 4 is a flow diagram of an example method for cleaning sensors of the example vehicle.

FIG. 4 illustrates an example method 400 for cleaning sensors of a vehicle, such as the example vehicle 100 of FIG. 1. The method 400 may be performed, for example, by the cleaning system 300 of FIG. 3.

The method 400 may comprise receiving 402 data indicative of a direction of travel of the vehicle, a speed of the vehicle, and an intensity of precipitation.

The method may determine 404, based on the received data and in particular the intensity of precipitation, whether there is any precipitation. If the method determines that there is no precipitation, no sensors are cleaned. Otherwise, the method may determine 406 whether the intensity of the precipitation is light. If it is determined that the intensity of the precipitation is light, the method may select one of a plurality of predefined cleaning sequences. Each of the predefined cleaning sequences may specify an order in which the sensors are to be cleaned, and may be based, at least in part, on one or more of the orientations of the sensors or the attributes of the sensors (e.g., the field-of-views, the focal lengths or the spectral ranges of the sensors). In this particular example, there are eight predefined cleaning sequences, and the method may select 421 cleaning sequence #1 in the event that the intensity of the precipitation is light. The method may then clean 430 the sensors in accordance with the selected sequence. Accordingly, in this particular example, when the intensity of the precipitation is light, the sensors are cleaned in a sequence, and thus at cleaning frequencies, that are independent of the speed of the vehicle or the direction of travel of the vehicle.

If it is determined that the intensity of the precipitation is not light, the method may determine 408 whether the intensity of the precipitation is medium. If it is determined that the intensity of the precipitation is medium, the method may determine 410, based on the received data and in particular the speed of the vehicle, whether the speed of the vehicle is greater than a threshold. In this particular example, the threshold may be 25 mph. If it is determined that the speed of the vehicle is not greater than the threshold, the method may select 422 cleaning sequence #2 from the plurality of predefined cleaning sequences, and then clean 430 the sensors in accordance with the selected sequence. Accordingly, when the intensity of the precipitation is medium and the speed of the vehicle is not greater than the threshold, the sensors are cleaned in a sequence, and thus at cleaning frequencies, that are independent of the direction of travel of the vehicle. If it is determined that the speed of the vehicle is greater than the threshold, the method may determine 412 whether the direction of travel of the vehicle is in a first direction or a second, opposite direction. If it is determined that the direction of travel is in the first direction, the method may select 423 cleaning sequence #3, otherwise the method may select 424 cleaning sequence #4 from the plurality of predefined cleaning sequences. The method may then clean 430 the sensors in accordance with the selected sequence. Accordingly, when the intensity of the precipitation is medium and the speed of the vehicle is greater than the threshold, the sensors are cleaned in a sequence, and thus at cleaning frequencies, that depend on the direction of travel of the vehicle.

If it is determined that the intensity of the precipitation is not medium, this may imply that the intensity of the precipitation is heavy. The method may then determine 414 whether the speed of the vehicle is greater than a threshold. In this particular example, the threshold may be again 25 mph. However, the method could conceivably employ a different threshold. Irrespective of whether the speed is greater than the threshold, the method determines 416,418 whether the direction of travel is in the first direction or the second, opposite direction. If it is determined that the speed of the vehicle is not greater than the threshold, and the direction of travel is in the first direction, the method may select 425 cleaning sequence #5. If it is determined that the speed of the vehicle is not greater than the threshold, and the direction of travel is in the second direction, the method may select 426 cleaning sequence #6. If it is determined that the speed of the vehicle is greater than the threshold, and the direction of travel is in the first direction, the method may select 427 cleaning sequence #7. And if it is determined that the speed of the vehicle is greater than the threshold, and the direction of travel is in the second direction, the method may select 428 cleaning sequence #8. The method may then clean 430 the sensors in accordance with the selected sequence. Accordingly, when the intensity of precipitation is heavy, the sensors are cleaned in a sequence, and thus at cleaning frequencies, that depend on both the direction of travel of the vehicle and the speed of the vehicle.

With the method 400 of FIG. 4, different cleaning sequences are using to clean sensors of a vehicle based on the direction of travel of the vehicle, the speed of the vehicle and the intensity of precipitation. It should be understood that the method 400 of FIG. 4 is provided by way of example only and that the sensors may be cleaned using an alternative number of cleaning sequences. For example, when the intensity of precipitation is light, the sensors may be cleaned using different cleaning sequences based on the direction of travel of the vehicle and/or the speed of the vehicle. Moreover, whilst the method 400 of FIG. 4 selects a cleaning sequence based, at least in part, on the direction of travel, the speed of the vehicle and the intensity of precipitation, the method may select a cleaning sequence based on fewer or additional attributes. For example, the method may determine a cleaning sequence based only on the intensity of precipitation and the direction of travel. Indeed, in some examples, the sensors may be cleaned using a single cleaning sequence that is not based on an attribute of travel or an attribute of the environment.

FIG. 5 details an example set of predefined sequences that may be employed with the example method of FIG. 4. The sensors detailed in FIG. 5 correspond to those sensors of the first array, C1-C9, of the example vehicle 100 detailed in FIG. 2. A similar set of sequences may employed to clean the sensors of the second array, C10-C18.

Sequence #1 may be employed when the intensity of the precipitation is light. The cleaning frequency for each of the sensors is the same for this particular sequence, and therefore no prioritization is given to any of the sensors.

Sequence #2 may be employed when the intensity of the precipitation is medium and the speed of the vehicle is not greater than a threshold (e.g., 25 mph). In comparison to sequence #1, the cleaning frequencies of the visible-light cameras having a wide field-of-view are higher, and the cleaning frequencies of the infrared cameras and the visible-light camera having a narrow field-of-view are lower. As noted above, infrared cameras may be less sensitive to precipitation than visible-light cameras, and cameras having a narrower field-of-view may be less sensitive to precipitation than cameras having a wider field-of-view. Accordingly, by employing this particular sequence, those sensors whose vision is more likely to be compromised by the increase in the intensity of the precipitation may be prioritized.

Sequences #3 and #4 may be employed when the intensity of the precipitation is medium and the speed of the vehicle is greater than the threshold (e.g., 25 mph). Sequence #3 may then be employed when the direction of travel of the vehicle is in a first direction, and sequence #4 may be employed when the direction of travel is in a second, opposite direction. In comparison to sequence #2, the cleaning frequencies of the forward-facing cameras and the sideward-facing cameras are higher, and the cleaning frequencies of the rearward-facing cameras, the infrared cameras and the camera having a narrow field-of-view are lower. As noted above, as the speed of the vehicle increases, precipitation may accumulate on the rearward-facing cameras at a slower rate. Accordingly, by employing this particular sequence, those sensors which are more likely to accumulate precipitation at a faster rate may be prioritized.

Sequences #5 and #6 may be employed when the intensity of the precipitation is heavy and the speed of the vehicle is not greater than a threshold (e.g., 25 mph). Sequence #5 may then be employed when the direction of travel of the vehicle is in the first direction, and sequence #6 may be employed when the direction of travel is in the second direction. In comparison to sequence #2, the cleaning frequencies of the visible-light, forward-facing cameras having a wide field-of-view increases, and the cleaning frequencies of all other cameras decreases. As a result, those sensors whose vision is more likely to be compromised by the increase in the intensity of the precipitation may be prioritized.

Sequences #7 and #8 may be employed when the intensity of the precipitation is heavy and the speed of the vehicle is greater than the threshold. Sequence #7 may then be employed when the direction of travel of the vehicle is in the first direction, and sequence #8 may be employed when the direction of travel is in the second direction. Like sequences #5 and #6, the visible-light, forward-facing cameras having a wide field-of-view are prioritized over all other cameras. However, in comparison to sequences #5 and #6, the cleaning frequencies of the visible-light, forward-facing cameras having a wide field-of-view are higher, and the cleaning frequencies of the other cameras is lower. As the speed of the vehicle increases, precipitation may accumulate on the forward-facing cameras at a faster rate. Accordingly, by employing this particular sequence, a higher cleaning frequency may be achieved for the forward-facing cameras and thus good vision may be maintained.

Again, it should be understood that the set of cleaning sequences detailed in FIG. 5 are provided by way of example only and that an alternative set cleaning sequences may be employed to clean the sensors.

FIG. 5 details effective cleaning frequencies for the sensors for each of the cleaning sequences. These cleaning frequencies arise from the fact that, in this particular example, the cleaning elements associated with the sensors are activated for an activation period of 20 ms, i.e., the valve of each cleaning element is opened and thus the nozzle emits compressed gas for a period of 20 ms. Additionally, in this particular example, there is an activation interval of 100 ms between consecutive activations, i.e., from the activation of one cleaning element in the sequence to the activation of the next cleaning element. Accordingly, the total period between activations is 120 ms. In other examples, the activation period and/or the activation interval may be different. In some examples, different activation periods and/or different activation intervals may be employed for different sensors. For example, a longer activation period may be employed for those sensors that are more likely to be compromised by the prevailing precipitation. Where a longer activation period is employed, this may be followed by a longer activation interval in order to ensure that the tanks of the cleaning system have been charged sufficiently by the compressors. In examples, the activation periods and/or the activation intervals may be based, at least in part, on the attribute(s) of travel and/or the attribute(s) of the environment. In some examples, one or more of the cleaning sequences may specify the activation periods and/or the activation intervals of the sensors, in addition to the order in which the sensors are to be cleaned.

Figure 6:
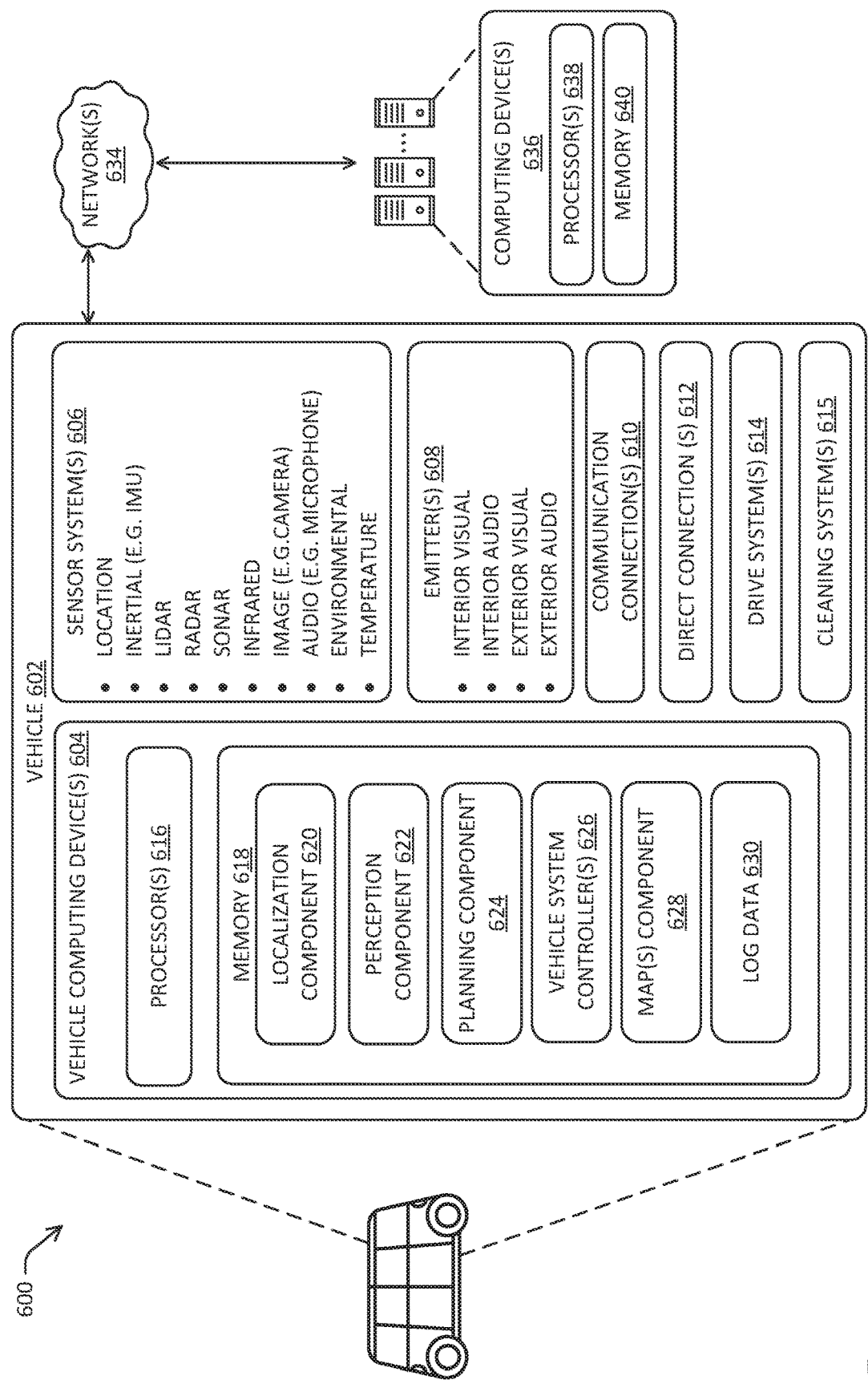
FIG. 6 is a block diagram of an example system for implementing the techniques described herein.

FIG. 6 is a block diagram illustrating an example system 600 for implementing some of the various technologies described herein. In some examples, the system 600 may include one or multiple features, components, and/or functionality of examples described herein with reference to other figures.

The system 600 may include a vehicle 602. In some examples, the vehicle 602 may include some or all of the features, components, and/or functionality described above with respect to the example vehicle 100. As shown in FIG. 6, the vehicle 602 may also include a vehicle computing device 604, one or more sensor systems 606, one or more emitters 608, one or more communication connections 610, one or more direct connections 612, one or more drive systems 614, and/or one or more cleaning systems 615.

The vehicle computing device 604 can, in some examples, include one or more processors 616 and memory 618 communicatively coupled with the one or more processors 616. In the illustrated example, the vehicle 602 is an autonomous vehicle; however, the vehicle 602 could be any other type of vehicle (e.g., automobile, truck, bus, aircraft, watercraft, train, etc.), or any other system having components such as those illustrated in FIG. 6. In examples, the one or more processors 616 may execute instructions stored in the memory 618 to perform one or more operations on behalf of the one or more vehicle computing devices 604.

The memory 618 of the one or more vehicle computing devices 604 can store a localization component 620, a perception component 622, a planning component 624, one or more system controllers 626, a map(s) component 628, and log data 630. Though depicted in FIG. 6 as residing in memory 618 for illustrative purposes, it is contemplated that the localization component 620, perception component 622, planning component 624, one or more system controllers 626, map(s) component 628, and/or the log data 630 can additionally, or alternatively, be accessible to the vehicle 602 (e.g., stored on, or otherwise accessible from, memory remote from the vehicle 602, such as memory 640 of one or more computing devices 636).

In at least one example, the localization component 620 can include functionality to receive data from the sensor system(s) 606 to determine a position and/or orientation of the vehicle 602 (e.g., one or more of an x-, y-, z-position, roll, pitch, or yaw). For example, the localization component 620 can include and/or request/receive a map of an environment and can continuously determine a location and/or orientation of the autonomous vehicle within the map. In some instances, the localization component 620 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 606 or received from one or more other devices (e.g., computing devices 636) to accurately determine a location of the autonomous vehicle 602. In some instances, the localization component 620 can provide data to various components of the vehicle 602 to determine an initial position of the autonomous vehicle 602 for generating a trajectory and/or for determining to retrieve map data. In various examples, the localization component 620 can provide data to a web-based application that may generate a data visualization associated with the vehicle 602 based at least in part on the data.

In some instances, the perception component 622 can include functionality to perform object tracking, detection, segmentation, and/or classification. In some examples, the perception component 622 can provide processed sensor data that indicates a presence of an entity that is proximate to the vehicle 602 and/or a classification of the entity as an entity type (e.g., car, pedestrian, cyclist, animal, building, tree, road surface, curb, sidewalk, unknown, etc.). In additional and/or alternative examples, the perception component 622 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 622 may provide data to a web-based application that generates a data visualization associated with the vehicle 602 based at least in part on the data.

In general, the planning component 624 can determine a path for the vehicle 602 to follow to traverse through an environment. For example, the planning component 624 can determine various routes and trajectories and various levels of detail. For example, the planning component 624 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 624 can generate an instruction for guiding the autonomous vehicle along at least a portion of the route from the first location to the second location. In at least one example, the planning component 624 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 602 to navigate.

In at least one example, the vehicle computing device 604 can include one or more system controllers 626, which can be configured to control steering, propulsion, braking, safety, emitters, communication, components, and other systems of the vehicle 602. These system controller(s) 626 can communicate with and/or control corresponding systems of the drive assembly(s) 614 and/or other components of the vehicle 602.

The memory 618 can further include the map(s) component 628 to maintain and/or update one or more maps (not shown) that can be used by the vehicle 602 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 602 can be controlled based at least in part on the maps. That is, the maps can be used in connection with the localization component 620, the perception component 622, and/or the planning component 624 to determine a location of the vehicle 602, identify objects in an environment, and/or generate routes and/or trajectories to navigate within an environment. Additionally, the maps can be used in connection with the web-based application to generate content associated with the vehicle 602, such as a data visualization.

In some examples, the one or more maps can be stored on a remote computing device(s) (such as the computing device(s) 636) accessible via one or more network(s) 634. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 618 may also store log data 630 associated with the vehicle. For instance, the log data 630 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 630.

In some instances, aspects of some or all of the memory-stored components discussed herein can include any models, algorithms, and/or machine learning algorithms. For example, in some instances, components in the memory 618 (and the memory 640, discussed in further detail below) such as the localization component 620, the perception component 622, and/or the planning component 624 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 606 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 606 can include multiple instances of each of these or other types of sensors. For instance, the lidar sensors can include individual lidar sensors located at the corners, front, back, sides, and/or top of the vehicle 602. As another example, the image sensors can include multiple image sensors disposed at various locations about the exterior and/or interior of the vehicle 602. As an even further example, the audio sensors can include multiple audio sensors disposed at various locations about the exterior and/or interior of the vehicle 602. Additionally, the audio sensors can include an array of a plurality of audio sensors for determining directionality of audio data. The sensor system(s) 606 can provide input to the vehicle computing device 604. Additionally, or alternatively, the sensor system(s) 606 can send sensor data, via the one or more networks 634, to the one or more computing device(s) 636 at a particular frequency, after a lapse of a predetermined period of time, in near real-time, etc.

The vehicle 602 can also include one or more emitters 608 for emitting light and/or sound. The emitters 608 in this example include interior audio and visual emitters to communicate with occupants of the vehicle 602. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 602 can also include one or more communication connection(s) 610 that enable communication between the vehicle 602 and one or more other local or remote computing device(s). For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, laptop computer etc.). The communications connection(s) 610 also enable the vehicle 602 to communicate with a remote teleoperations system or other remote services.

The communications connection(s) 610 can include physical and/or logical interfaces for connecting the vehicle computing device(s) 604 to another computing device (e.g., computing device(s) 636) and/or a network, such as network(s) 634. For example, the communications connection(s) 610 can enable Wi-Fi-based communication such as via frequencies defined by the IEEE 602.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 612 of vehicle 602 can provide a physical interface to couple the one or more drive system(s) 614 with the body of the vehicle 602. For example, the direct connection 612 can allow the transfer of energy, fluids, air, data, etc. between the drive assembly(s) 614 and the vehicle 602. In some instances, the direct connection 612 can further releasably secure the drive assembly(s) 614 to the body of the vehicle 602.

In at least one example, the vehicle 602 can include one or more drive assemblies 614. In some examples, the vehicle 602 can have a single drive assembly 614. In at least one example, if the vehicle 602 has multiple drive assemblies 614, individual drive assemblies 614 can be positioned on opposite longitudinal ends of the vehicle 602 (e.g., the leading and trailing ends, the front and the rear, etc.).

The drive system(s) 614 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include one or more drive system controllers which can receive and preprocess data from the sensor system(s) and to control operation of the various vehicle systems. In some examples, the drive system controller(s) can include one or more processors and memory communicatively coupled with the one or more processors. The memory can store one or more systems to perform various functionalities of the drive system(s) 614. Furthermore, the drive assembly(s) 614 may also include one or more communication connection(s) that enable communication by the respective drive assembly with one or more other local or remote computing device(s).

The cleaning system(s) 615 can include one or more cleaning elements to clean one or more of the sensors of the sensor system 606. In examples, the cleaning system(s) can include one or more cleaning system controllers for controlling the activation of the cleaning elements. In some examples, the cleaning system controller(s) can include one or more processors and memory communicatively coupled with the one or more processors. The memory can store one or more systems to perform various functionalities of the cleaning system(s) 615. In examples, the cleaning system controller(s) may for part of the vehicle computing device(s) 604. For example, the system(s) stored by the memory may form part of the vehicle system controller(s) 626. In examples, the cleaning system(s) may clean the sensor(s) at cleaning frequencies that are based, at least in part, on one or more of an orientation of the sensor(s), an attribute of the sensor(s), an attribute of the travel of the vehicle, or an attribute of the environment. In some examples, the cleaning system(s) can include one or more of the cleaning systems 300 described above in connection with FIGS. 1 to 5, or the cleaning system(s) can employ one or more of the techniques, features and/or functionality of the cleaning systems 300 described above.

The computing device(s) 636 can include one or more processors 638 and memory 640 that may be communicatively coupled to the one or more processors 638. In some examples, the computing device(s) 636 may be associated with a teleoperations system that remotely monitors a fleet of vehicles. Additionally, or alternatively, the computing devices(s) 636 may be leveraged by the teleoperations system to receive and/or process data on behalf of the teleoperations system.

The processor(s) 616 of the vehicle 602 and the processor(s) 638 of the computing device(s) 636 can be any suitable processor capable of executing instructions to process data and perform operations as described herein. By way of example and not limitation, the processor(s) 616 and 638 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 618 and 640 are examples of non-transitory computer-readable media. The memory 618 and 640 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components of the vehicle 602 of FIG. 6 are described herein as divided for illustrative purposes. However, the operations performed by the various components can be combined or performed in any other component. It should be noted that while FIG. 6 is illustrated as a distributed system, in alternative examples, components of the vehicle 602 can be associated with the computing device(s) 636 and/or components of the computing device(s) 636 can be associated with the vehicle 602. That is, the vehicle 602 can perform one or more of the functions associated with the computing device(s) 636, and vice versa.

Example Clauses

A. An autonomous vehicle comprising: sensors; a compressor; a tank coupled to the compressor, the tank configured to store gas compressed by the compressor; cleaning elements coupled to the tank, the cleaning elements configured to emit, upon activation, jets of gas to clean the sensors; one or more processors; and one or more non-transitory computer-readable storage media storing instructions which, when executed by the one or more processors, cause the autonomous vehicle to perform operations comprising: determining an attribute of an environment of the autonomous vehicle; determining one or more of orientations of the sensors or attributes of the sensors; determining, based at least in part on the attribute of the environment and one or more of the orientations of the sensors or the attributes of the sensors, frequencies to activate the cleaning elements; and activating the cleaning elements at the determined frequencies to clean the sensors.

B. The vehicle as paragraph A describes, wherein the attribute of the environment comprises one or more of a type of precipitation or an intensity of precipitation.

C. The vehicle as paragraph A describes, wherein the attributes of the sensors comprise one or more of fields-of-view of the sensors, focal lengths of the sensors, or spectral ranges of the sensor.

D. The vehicle as paragraph A describes, wherein: the operations further comprise determining an attribute of travel of the autonomous vehicle; and determining the frequencies is further based, at least in part, on the attribute of travel.

E. The vehicle as paragraph D describes, wherein the autonomous vehicle is bidirectional and the attribute of travel comprises a directional of travel of the autonomous vehicle.

F. The vehicle as paragraph A describes, wherein: the one or more non-transitory computer-readable storage media store a plurality of predefined sequences; determining the frequencies comprises selecting one of the plurality of predefined sequences based, at least in part, on the attribute of the environment; and activating the cleaning elements comprises activating the cleaning elements in accordance with the selected sequence.

G. A method comprising: determining an attribute of an environment of a vehicle; determining one or more of an orientation of a sensor of the vehicle or an attribute of the sensor; determining, based at least in part on the attribute of the environment and one or more of the orientation of the sensor or the attribute of the sensor, a frequency to activate a cleaning element of the vehicle, wherein the cleaning element is configured to clean the sensor; and activating the cleaning element at the frequency to clean the sensor.

H. The method as paragraph G describes, wherein the attribute of the environment comprises one or more of a type of precipitation or an intensity of precipitation.

I. The method as paragraph G describes, wherein the attribute of the sensor comprises one or more of a field-of-view of the sensor, a focal length of the sensor, or a spectral range of the sensor.

J. The method as paragraph G describes, wherein: the method further comprises determining an attribute of travel of the vehicle; and determining the frequency is further based, at least in part, on the attribute of travel.

K. The method as paragraph J describes, wherein the attribute of travel comprises one or more of a direction of travel of the vehicle or a speed of the vehicle.

L. The method as paragraph G describes, wherein determining the frequency comprises: determining a first frequency based at least in part on a determination that the sensor has an orientation that is predominantly forward-facing relative to a direction of travel of the vehicle; and determining a second frequency based at least in part on a determination that the sensor has an orientation that is predominantly rearward-facing or sideward-facing relative to the direction of travel of the vehicle, wherein the second frequency is lower than the first frequency.

M. The method as paragraph G describes, wherein the attribute of the sensor comprises one or more of a field-of-view of the sensor, a focal length of the sensor, or a spectral range of the sensor, and determining the frequency comprises: determining a first frequency based at least in part on a determination that the sensor has a first field-of-view, a first focal length, or a first spectral range; and determining a second frequency based at least in part on a determination that the sensor has a second field-of-view narrow than the first field-of-view, a second focal length longer than the first focal length, or a second spectral range lower than the first spectral range, wherein the second frequency is lower than the first frequency.

N. The method as paragraph G describes, comprising: determining one or more of orientations of a plurality of sensors of the vehicle or attributes of the sensors; determining, based at least in part on the attribute of the environment and one or more of the orientations of the sensors or the attributes of the sensors, frequencies to activate cleaning elements of the vehicle, wherein the cleaning elements are configured to clean the sensors; and activating the cleaning elements at the frequencies to clean the sensors.

O. The method as paragraph N describes, wherein: the sensors comprise a first sensor and a second sensor; the first sensor comprises one or more of: an orientation that is predominantly forward-facing relative to a direction of travel of the vehicle, a first field-of-view, a first focal length, or a first spectral range; the second sensor comprise one or more of: an orientation that is predominantly rearward-facing or sideward-facing relative to the direction of travel of the vehicle, a second field-of-view narrower than the first field-of-view, a second focal length longer than the first focal length, or a second spectral range lower than the first spectral range; and determining the frequencies comprises determining a first frequency for the first sensor and a second frequency for the second sensor, wherein the second frequency is lower than the first frequency.

P. The method as paragraph N describes, wherein: determining the frequencies comprises determining a cleaning sequence, wherein the frequencies of the plurality of cleaning elements are based, at least in part, on occurrences of an identifier of each of the cleaning elements within the cleaning sequence; and activating the cleaning elements comprises activating the cleaning elements in accordance with the cleaning sequence.

Q. The method as paragraph P describes, further comprising: storing a plurality of predefined cleaning sequences, and wherein determining the cleaning sequence comprises selecting one of the plurality of predefined cleaning sequences based, at least in part, on the attribute of the environment.

R. The method as paragraph Q describes, wherein: the method further comprises determining an attribute of travel of the vehicle; and selecting one of the plurality of predefined cleaning sequences is further based, at least in part, on the attribute of travel.

S. The method as paragraph N describes, further comprising: determining that one or more of the plurality of sensors has compromised vision; suspending the cleaning sequence; activating one or more of the cleaning elements to clean the one or more of the plurality of sensors having compromised vision; and resuming the cleaning sequence.

T. The method as paragraph G describes, One or more non-transitory computer-readable storage media storing instructions executable by one or more processors, wherein the instructions, when executed, cause the one or more processors to perform operations comprising: determining an attribute of an environment of a vehicle; determining one or more of an orientation of a sensor of the vehicle or an attribute of the sensor; determining, based at least in part on the attribute of the environment and one or more of the orientation of the sensor or the attribute of the sensor, a frequency to activate a cleaning element of the vehicle, wherein the cleaning element is configured to clean the sensor; and activating the cleaning element at the frequency to clean the sensor.

While the example clauses described above are described with respect to one particular implementation, it should be understood that, in the context of this document, the content of the example clauses can also be implemented via a method, device, system, computer-readable storage medium, and/or another implementation. Additionally, any of examples A-T may be implemented alone or in combination with any other one or more of the examples A-T.

What is claimed is:

1. An autonomous vehicle comprising:
   sensors;
   a compressor;
   a tank coupled to the compressor, the tank configured to store gas compressed by the compressor;
   cleaning elements coupled to the tank, the cleaning elements configured to emit, upon activation, jets of gas to clean the sensors;
   one or more processors; and
   one or more non-transitory computer-readable storage media storing instructions which, when executed by the one or more processors, cause the autonomous vehicle to perform operations comprising:
   determining an attribute of an environment of the autonomous vehicle;
   determining one or more of orientations of the sensors or attributes of the sensors;
   determining, based at least in part on the attribute of the environment and one or more of the orientations of the sensors or the attributes of the sensors, frequencies to activate the cleaning elements;
   activating the cleaning elements at the determined frequencies to clean the sensors; and
   wherein the attributes of the sensors comprise one or more of fields-of-view of the sensors, focal lengths of the sensors, or spectral ranges of the sensors, and determining the frequencies comprises:
   determining a first frequency based at least in part on a determination that the sensors have a first field-of-view, a first focal length, or a first spectral range; and
   determining a second frequency based at least in part on a determination that the sensors have a second field-of-view narrow than the first field-of-view, a second focal length longer than the first focal length, or a second spectral range lower than the first spectral range,
   wherein the second frequency is lower than the first frequency.

2. The autonomous vehicle of claim 1, wherein the attribute of the environment comprises one or more of a type of precipitation or an intensity of precipitation.

3. The autonomous vehicle of claim 1, wherein:
   the operations further comprise determining an attribute of travel of the autonomous vehicle; and
   determining the frequencies is further based, at least in part, on the attribute of travel.

4. The autonomous vehicle of claim 3, wherein the autonomous vehicle is bidirectional and the attribute of travel comprises a directional of travel of the autonomous vehicle.

5. The autonomous vehicle of claim 1, wherein:
   the one or more non-transitory computer-readable storage media store a plurality of predefined sequences;

determining the frequencies comprises selecting one of the plurality of predefined sequences based, at least in part, on the attribute of the environment; and activating the cleaning elements comprises activating the cleaning elements in accordance with the selected sequence.

6. A method comprising:

determining an attribute of an environment of a vehicle;

determining one or more of an orientation of a sensor of the vehicle or an attribute of the sensor;

determining, based at least in part on the attribute of the environment and one or more of the orientation of the sensor or the attribute of the sensor, a frequency to activate a cleaning element of the vehicle, wherein the cleaning element is configured to clean the sensor;

activating the cleaning element at the frequency to clean the sensor; and wherein the attribute of the sensor comprises one or more of a field-of-view of the sensor, a focal length of the sensor, or a spectral range of the sensor, and determining the frequency comprises:

determining a first frequency based at least in part on a determination that the sensor has a first field-of-view, a first focal length, or a first spectral range; and determining a second frequency based at least in part on a determination that the sensor has a second field-of-view narrow than the first field-of-view, a second focal length longer than the first focal length, or a second spectral range lower than the first spectral range, wherein the second frequency is lower than the first frequency.

7. The method of claim 6, wherein the attribute of the environment comprises one or more of a type of precipitation or an intensity of precipitation.

8. The method of claim 6, wherein:

the method further comprises determining an attribute of travel of the vehicle; and determining the frequency is further based, at least in part, on the attribute of travel.

9. The method of claim 8, wherein the attribute of travel comprises one or more of a direction of travel of the vehicle or a speed of the vehicle.

10. A method as claimed in claim 6, wherein determining the frequency comprises:

determining a first frequency based at least in part on a determination that the sensor has an orientation that is predominantly forward-facing relative to a direction of travel of the vehicle; and determining a second frequency based at least in part on a determination that the sensor has an orientation that is predominantly rearward-facing or sideward-facing relative to the direction of travel of the vehicle, wherein the second frequency based at least in part on a determination that the sensor has an orientation that is predominantly rearward-facing or sideward-facing relative to the direction of travel of the vehicle is lower than the first frequency based at least in part on a determination that the sensor has an orientation that is predominantly forward-facing relative to a direction of travel.

11. The method of claim 6, comprising:

determining one or more orientations of a plurality of sensors of the vehicle or attributes of the sensors;

determining, based at least in part on the attribute of the environment and one or more of the orientations of the sensors or the attributes of the sensors, frequencies to activate cleaning elements of the vehicle, wherein the cleaning elements are configured to clean the sensors; and activating the cleaning elements at the frequencies to clean the sensors.

12. The method of claim 11, wherein:

the sensors comprise a first sensor and a second sensor;

the first sensor comprises one or more of: an orientation that is predominantly forward-facing relative to a direction of travel of the vehicle, a first field-of-view, a first focal length, or a first spectral range;

the second sensor comprise one or more of: an orientation that is predominantly rearward-facing or sideward-facing relative to the direction of travel of the vehicle, a second field-of-view narrower than the first field-of-view, a second focal length longer than the first focal length, or a second spectral range lower than the first spectral range; and determining the frequencies comprises determining a first frequency for the first sensor and a second frequency for the second sensor, wherein the second frequency of the second sensor is lower than the first frequency of the first sensor.

13. The method of claim 11, wherein:

determining the frequencies comprises determining a cleaning sequence, wherein the frequencies of the plurality of cleaning elements are based, at least in part, on occurrences of an identifier of each of the cleaning elements within the cleaning sequence; and activating the cleaning elements comprises activating the cleaning elements in accordance with the cleaning sequence.

14. The method of claim 13, further comprising:

storing a plurality of predefined cleaning sequences, and wherein determining the cleaning sequence comprises selecting one of the plurality of predefined cleaning sequences based, at least in part, on the attribute of the environment.

15. The method of claim 14, wherein:

the method further comprises determining an attribute of travel of the vehicle; and selecting one of the plurality of predefined cleaning sequences is further based, at least in part, on the attribute of travel.

16. The method of claim 13, further comprising:

determining that one or more of the plurality of sensors has compromised vision;

suspending the cleaning sequence;

activating one or more of the cleaning elements to clean the one or more of the plurality of sensors having compromised vision; and resuming the cleaning sequence.

17. One or more non-transitory computer-readable storage media storing instructions executable by one or more processors, wherein the instructions, when executed, cause the one or more processors to perform operations comprising:

determining an attribute of an environment of a vehicle;

determining one or more of an orientation of a sensor of the vehicle or an attribute of the sensor;

determining, based at least in part on the attribute of the environment and one or more of the orientation of the sensor or the attribute of the sensor, a frequency to activate a cleaning element of the vehicle, wherein the cleaning element is configured to clean the sensor;

activating the cleaning element at the frequency to clean the sensor; and wherein the attribute of the sensor comprises one or more of a field-of-view of the sensor, a focal length of the sensor, or a spectral range of the sensor, and determining the frequency comprises:

determining a first frequency based at least in part on a determination that the sensor has a first field-of-view, a first focal length, or a first spectral range; and determining a second frequency based at least in part on a determination that the sensor has a second field-of-view narrow than the first field-of-view, a second focal length longer than the first focal length, or a second spectral range lower than the first spectral range, wherein the second frequency is lower than the first frequency.

* * * * *